US012757841B2

(12) United States Patent
Christiaens

(10) Patent No.: US 12,757,841 B2
(45) Date of Patent: Oct. 13, 2026

(54) HEAT EXCHANGER FOR TEMPERATURE CONTROL OF A SUBSTRATE FOR CULTIVATING HORTICULTURAL PRODUCTS, SUBSTRATE DRAWER, AND RACK

(71) Applicant: Christiaens Group B.V., Horst (NL)

(72) Inventor: Martinus Leonardus Hendrikus Maria Christiaens, Swolgen (NL)

(73) Assignee: CHRISTIAENS GROUP B.V., Horst (NL)

( * ) Notice: Subject to any disclaimer, the term of this patent is extended or adjusted under 35 U.S.C. 154(b) by 0 days.

(21) Appl. No.: 18/864,438

(22) PCT Filed: May 23, 2023

(86) PCT No.: PCT/NL2023/050294
§ 371 (c)(1),
(2) Date: Nov. 8, 2024

(87) PCT Pub. No.: WO2023/229459
PCT Pub. Date: Nov. 30, 2023

(65) Prior Publication Data

US 2025/0331472 A1 Oct. 30, 2025

(30) Foreign Application Priority Data

May 23, 2022 (NL) ...................................... 2031962

(51) Int. Cl.
*A01G 9/24* (2006.01)
*A01G 7/04* (2006.01)
(Continued)

(52) U.S. Cl.
CPC ............. *A01G 9/245* (2013.01); *A01G 7/045* (2013.01); *A01G 9/023* (2013.01); *F28F 3/12* (2013.01)

(58) Field of Classification Search
CPC .......... A01G 9/245; A01G 9/24; A01G 9/246; A01G 31/06; A01G 9/1423
See application file for complete search history.

(56) References Cited

U.S. PATENT DOCUMENTS 11,083,142 B2 8/2021 Van Gemert et al.
12,041,898 B2 * 7/2024 Romine ................ A01G 9/023
(Continued)

FOREIGN PATENT DOCUMENTS

CN 201992863 U 9/2011
CN 106688708 A 5/2017
(Continued)

OTHER PUBLICATIONS

International Search Report dated Jul. 27, 2023, issued in corresponding International Application No. PCT/NL2023/050294 (2 pgs.).

(Continued)

*Primary Examiner* — Kristen C Hayes
(74) *Attorney, Agent, or Firm* — Pillsbury Winthrop Shaw Pittman, LLP

(57) ABSTRACT

A heat exchanger for temperature control of a substrate for cultivating horticultural products. The heat exchanger has a structure comprising a heat exchange surface arranged for heating or cooling the substrate. The structure is arranged for supporting the substrate for thereby forming a carrier plate with a carrier surface such that the heat exchange surface forms the carrier surface. The heat exchanger comprises or is configured for cooperating with one or more mounts arranged for suspending the heat exchanger to a rack. The structure of the heat exchanger is constructed such as to be self-supporting for supporting the substrate at least between
(Continued)

the one or more mounts, such that a bottom surface of the structure opposite the heat exchange surface faces an ambient environment.

14 Claims, 7 Drawing Sheets

(51) Int. Cl.
*A01G 9/02* (2018.01)
*F28F 3/12* (2006.01)

(56) References Cited

U.S. PATENT DOCUMENTS

| | | | | |
|---|---|---|---|---|
| 2019/0059241 | A1* | 2/2019 | Bogner | A01G 9/249 |
| 2020/0288645 | A1* | 9/2020 | Bogner | A01G 9/249 |
| 2021/0325129 | A1 | 10/2021 | Spangler et al. | |
| 2022/0240458 | A1* | 8/2022 | Breza | A01G 9/249 |

FOREIGN PATENT DOCUMENTS

| | | | | | |
|---|---|---|---|---|---|
| DE | 19828907 | A1 | | 12/1999 | |
| EP | 2564687 | A2 | | 3/2013 | |
| GB | 1402261 | A | * | 8/1975 | A01G 9/00 |
| JP | H0410746 | Y2 | * | 3/1992 | |
| JP | 6056929 | B1 | * | 1/2017 | A01G 9/24 |
| JP | 2017055720 | A | * | 3/2017 | A01G 9/24 |
| JP | 6546423 | B2 | * | 7/2019 | |
| KR | 2025085526 | A | * | 6/2025 | |
| WO | WO-2004026023 | A1 | * | 4/2004 | A01G 9/246 |
| WO | 2014/201588 | A1 | | 12/2014 | |

OTHER PUBLICATIONS

International Preliminary Report on Patentability dated Sep. 16, 2024, issued in corresponding International Application No. PCT/NL2023/050294 (12 pgs.).

First Office Action dated Dec. 25, 2025, issued in corresponding Chinese Patent Application No. 202380042039.7, with English translation (17 pgs.).

* cited by examiner

HEAT EXCHANGER FOR TEMPERATURE CONTROL OF A SUBSTRATE FOR CULTIVATING HORTICULTURAL PRODUCTS, SUBSTRATE DRAWER, AND RACK

CROSS-REFERENCE TO RELATED APPLICATIONS

This application is a national stage entry of PCT/NL2023/050294, filed May 23, 2023, which claims priority to NL 2031962, filed May 23, 2022, all contents of each of which are hereby incorporated by reference in their entireties.

The invention relates to a heat exchanger for temperature control of a substrate for cultivating horticultural products. The invention further relates to a substrate carrier and/or a rack provided with such a heat exchanger.

Horticultural products, such as mushrooms, fruits, vegetables, or mycelium, are typically cultivated in a controlled environment, e.g. in indoor facilities, where growing conditions such as lighting, humidity and temperature can be monitored and regulated. The products are grown on a layer of substrate, such as soil, sawdust or straw, which may be supported by carrier plates, arranged on multiple levels in a rack.

The optimal temperature and humidity of the substrate may vary in time, depending on the cultivation phase of the product. For example, mild substrate conditions may be desirable in a growing phase to promote product growth, while in a harvesting phase the temperature of the substrate may be increased to reduce the humidity of the substrate, so that the harvesting process is facilitated. Controlling the temperature of the substrate may also be beneficial for other reasons, for example to optimize the growing conditions based on the type of horticultural product, the type of substrate, the nutrient uptake, seasonal aspects, and the growth stage of the product.

In conventional arrangements for cultivating horticultural products, the substrate is supported on a carrier structure, such as a carrier plate, which has a certain carrier surface area for carrying the substrate. Because of the weight of the substrate and the horticultural products growing on the substrate, the carrier structure may require a certain thickness for providing sufficient strength and stiffness, e.g. bending stiffness, across the surface area to support the substrate and horticultural products without damage or excessive deformation to the structure, e.g. when the substrate is suspended in a rack or other type of support.

Strength and stiffness for supporting the substrate and horticultural products may be provided by enclosing or sandwiching the heat exchanger within a carrier structure, e.g. by having the heat exchanger placed inside a carrier frame, or between a carrier plate and a substrate plate. However, upon heating the substrate, the carrier structure may act as a heat sink, causing part of the energy from the heat exchanger and/or the substrate to be transferred into the carrier structure. Conversely, when the heat exchanger is arranged for cooling the substrate, part of the heat stored in the carrier structure may be transferred into the heat exchanger and/or into the substrate. In such cases, the carrier structure thus acts as a heat source.

Known racks, e.g. as described in EP2564687, comprise a rack bottom, a carrier which is supported with respect to the rack bottom for the substrate, and a heat exchanger to heat and/or cool the substrate on the carrier. Although this makes it possible to influence the temperature of the substrate to a certain degree, the controllability of the substrate temperature is still quite poor, e.g. due to the internal arrangement of components and materials used, which affects the heat transfer properties of the system as a whole. As a result, the energy efficiency of these rack systems, as well as their horticultural yield, is suboptimal.

It is an object of the invention to provide a heat exchanger, with improved controllability of the temperature of a horticultural product substrate.

SUMMARY

In summary, the invention provides a heat exchanger for temperature control of a substrate for cultivating horticultural products. The heat exchanger has a structure comprising a heat exchange surface arranged for heating or cooling the substrate. The structure is arranged for supporting the substrate for thereby forming a carrier plate with a carrier surface such that the heat exchange surface forms the carrier surface. The heat exchanger comprises or is configured for cooperating with one or more mounts arranged for suspending the heat exchanger to a rack. The structure of the heat exchanger is constructed such as to be self-supporting for supporting the substrate at least between the one or more mounts, such that a bottom surface of the structure opposite the heat exchange surface faces an ambient environment.

By forming the carrier surface, the heat exchange surface directly contacts the substrate. The direct contact greatly benefits the controllability of the temperature. In addition, the self-supporting structure that supports the substrate allows the thermal mass between the heat exchanger and the substrate to be minimized and thereby thermal losses during the transfer of heat between the heat exchanger and the substrate are reduced. For example, when the heat exchanger is arranged for heating the substrate, any thermal mass contiguous to the heat exchanger (e.g. between the heat exchanger and the substrate) may act as a heat sink, thereby slowing down the heating process. Conversely, when the heat exchanger is arranged for cooling the substrate, such thermal mass may act as a heat source, thereby slowing down the cooling process. By reducing the amount of elements contiguous to the heat exchanger that may contribute to the thermal mass, the controllability of the temperature as well as the efficiency of the heat exchanger are improved. As may be appreciated, the direct manner of heating and cooling of the substrate combined with the improved efficiency of the heat exchanger due to the reduced amount of thermal mass, accumulates for a complete cultivation plant into a significant saving of energy usage, rendering the plant to be very durable and environmental friendly.

Because the structure of the heat exchanger is self-supporting, there is no need for additional support elements below the heat exchanger, in contrast to conventional heat exchanger systems, in which the heat exchanger is supported on a rack bottom. In the present invention there is no additional thermal mass below the heat exchanger. Accordingly, no heat sinks or sources are present below the heat exchanger that may disturb the heating or cooling process, and thus the controllability of the heat exchanger is improved.

The structure of the heat exchanger can comprise one or more support members, such as beams, wherein the one or more support members provide structural integrity in a direction parallel to the plane of the carrier plate. The support members can e.g. be arranged laterally, spanning between long sides of the heat exchanger, or can e.g. be arranged longitudinally, spanning between short sides of the heat exchanger, or can be arranged diagonally, spanning between corners of the heat exchanger. This allows other parts of the structure of the heat exchanger to have a lower stiffness against bending out of plane of the carrier plate, as the one or more support members can provide structural integrity to support the heat exchanger against gravitational loads, e.g. formed by the own weight of the heat exchanger, the weight of the substrate, and the weight of the horticultural products cultivated thereon.

Because of the absence of a rack bottom, there may be a risk that pieces of substrate fall through the heat exchanger structure and land on horticultural products that are cultivated on a lower level, e.g. in a rack. For this reason, the structure of the heat exchanger can form an impervious barrier, arranged for preventing passage of substrate material through the structure.

When the heat exchanger heats up or cools down the substrate, the structure of the heat exchanger will expand or contract, respectively. Considering the dimensions of the heat exchanger, which forms a carrier plate, the thermally induced expansion and contraction will be largest in plane of the carrier plate. When the heat exchanger is mounted at or along its edges, thereby restraining the freedom of movement in plane of the carrier plate, internal stresses will arise. To compensate for thermally induced contraction or expansion of the heat exchanger, the structure can comprise an extendible section, configured to extend or shorten in plane of the carrier plate.

Preferably, the extendible section is configured to extend or shorten by elastic deformation thereof. The extendible section can e.g. comprise a biasing element, which may be integrated in the structure, or can be a separate element.

In some embodiments, the structure comprises at least two compartments, wherein the extendible section is formed by at least one compartment of the at least two compartments. In this way, elastic deformation of at least one of the compartments can compensate for thermally induced contraction or expansion of the heat exchanger, while the compartments can e.g. be used holding or directing other components of the heat exchanger, such as cables, pipes, channels, or fluids.

Each compartment of the at least two compartments can for example comprise a circumferential outer wall, providing the heat exchange surface. In this way, the thermal mass as well as the resistance against elastic deformation can be reduced by decreasing the thickness of the circumferential wall between the interior of the compartment and the substrate.

The circumferential outer wall may comprise a top portion and a bottom portion, wherein the top portion and the bottom portion may be interconnected at respective opposing end sections thereof in plane of the carrier plate, and wherein each of the top and bottom portion may comprise a middle section that is bent outwards with respect to the plane of the carrier plate. As such the heat exchange surface and the bottom surface are both corrugated, bent, or folded, thereby decreasing the resistance against elastic deformation of the compartment.

Preferably, the circumferential outer wall has a diamond shaped cross section, having a long diagonal and a short diagonal, wherein the long diagonal is in plane of the carrier plate and wherein the short diagonal is perpendicular to the plane of the carrier plate. Accordingly, expansion of the heat exchanger in plane of the plate results in elongation of the long diagonal and in shortening of the short diagonal.

To provide an impervious barrier for preventing substrate material to pass through the structure of the heat exchanger, at least one of: the at least two compartments are interconnected by elastic elements, that are elastically deformable in plane of the carrier plate; and the heat exchanger is circumferentially provided with one or more elastically deformable elements; wherein the at least two compartments are rigidly interconnected.

In some embodiments, each compartment of the at least two compartments comprises a channel, through which a fluid can flow for heating or cooling the heat exchange surface. As such, the volume inside the compartments is used for guiding the fluid.

The channel may be connectable to an energy recovery system, the energy recovery system being arranged for recovering energy from heat produced by the substrate. In this way the energy efficiency of the heat exchanger can be improved.

In some embodiments, the structure comprises one or more walls mounted to the carrier plate. In this way, a container or drawer can be formed.

The one or more mounts, for movably mounting the heat exchanger to the rack, can comprise at least one of: bearings, rails or a carriage or sled. As a result, movable mounting arrangement is provided for directly mounting the heat exchanger to the rack.

By providing a bottom side of the heat exchanger with a light source, the lighting conditions of horticultural products that are cultivated on a lower level in a rack can be controlled, while waste heat produced by the light source can be (re)used by the heat exchanger, e.g. by using the waste heat to heat the substrate or by transferring the waste heat to an energy recovery system operatively coupled to the heat exchanger.

Another aspect of the invention relates to a substrate carrier for use in a rack for carrying a substrate for cultivating horticultural products, provided with a heat exchanger as described herein.

Yet another aspect of the invention relates to a rack for carrying a substrate for cultivating horticultural products, wherein the rack is provided with a heat exchanger as described herein.

The rack may further comprise an energy recovery system connectable to the heat exchanger, for recovering energy from fluid obtained from the heat exchanger, to improve the energy efficiency of the heat exchanger.

Additionally, or alternatively, the rack may be provided with a substrate carrier as described herein.

BRIEF DESCRIPTION OF THE DRAWINGS

The invention will be further elucidated in the figures.

DETAILED DESCRIPTION

Figure 1:
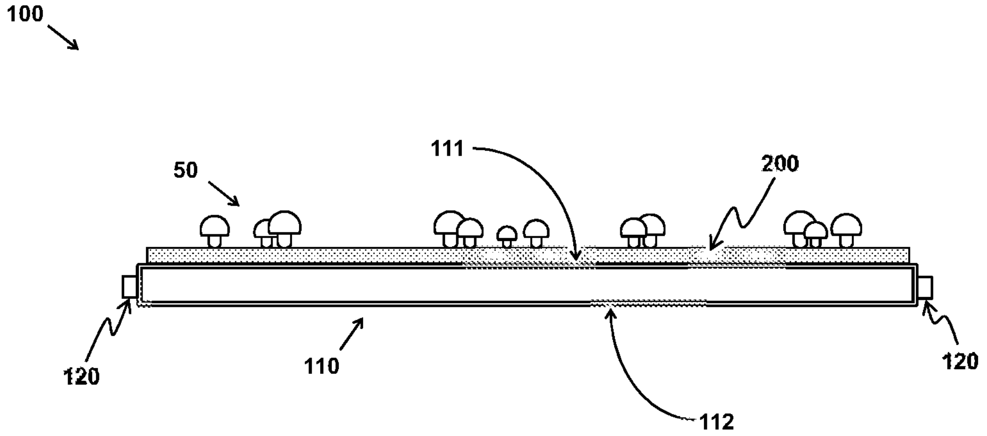
FIG. 1 illustrates a cross sectional view of an embodiment of a heat exchanger.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 2:
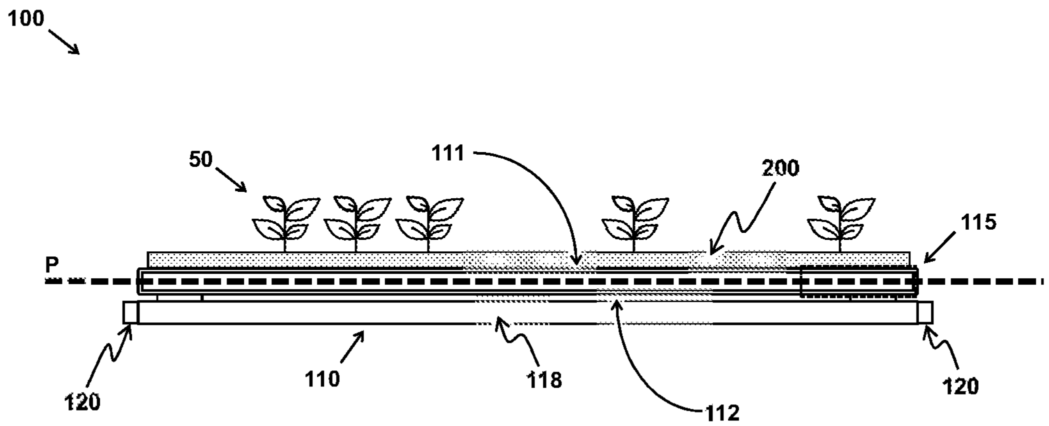
FIG. 2 illustrates a cross sectional view of another or further embodiment of a heat exchanger, comprising a support member.
Figure 3:
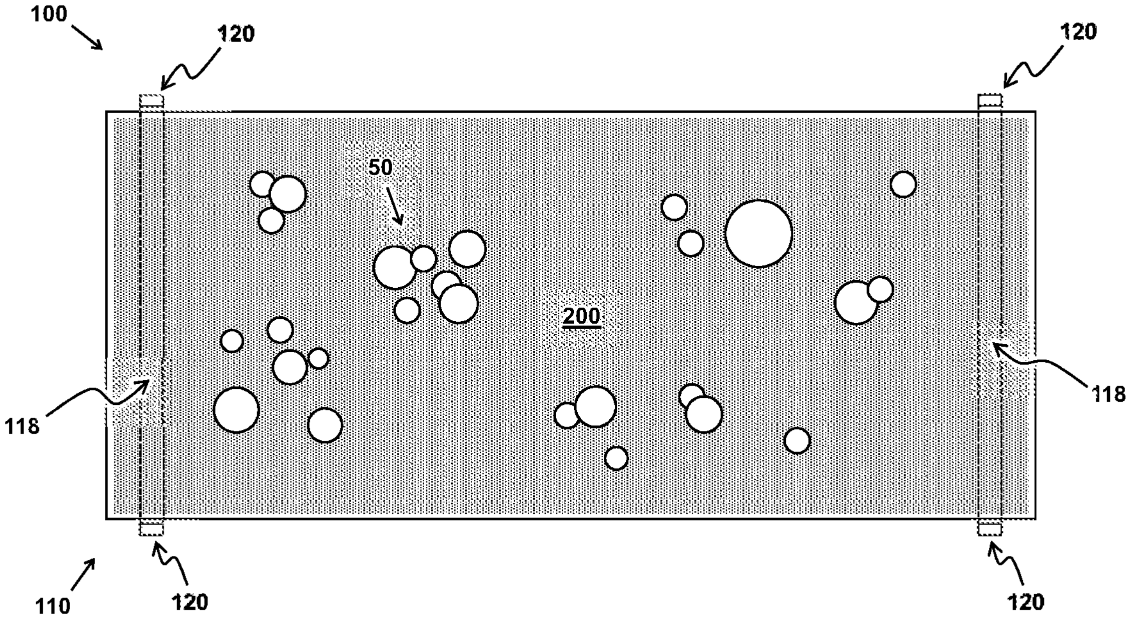
FIG. 3 illustrates a top view of another or further embodiment of a heat exchanger.
Figure 5:
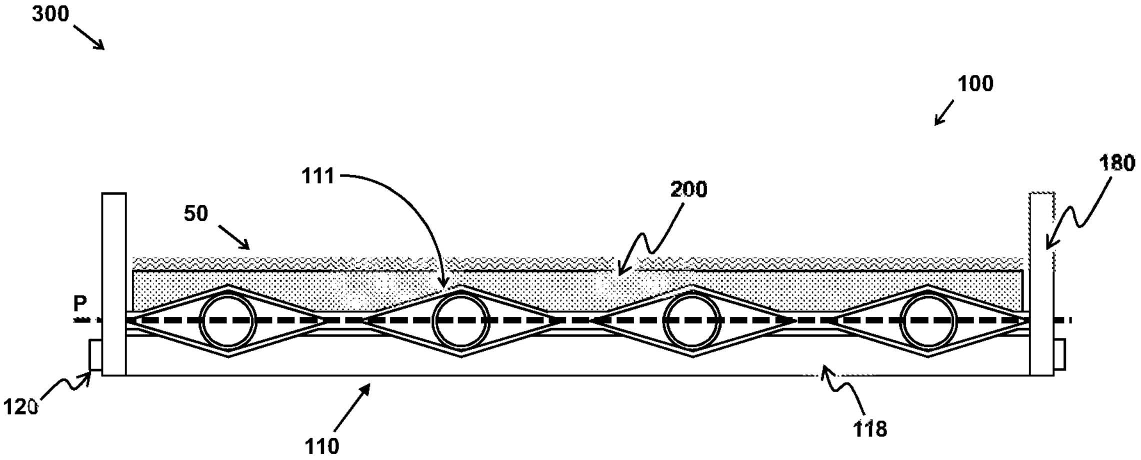
FIG. 5 illustrates a substrate drawer, provided with a heat exchanger as described herein.
Figure 6:
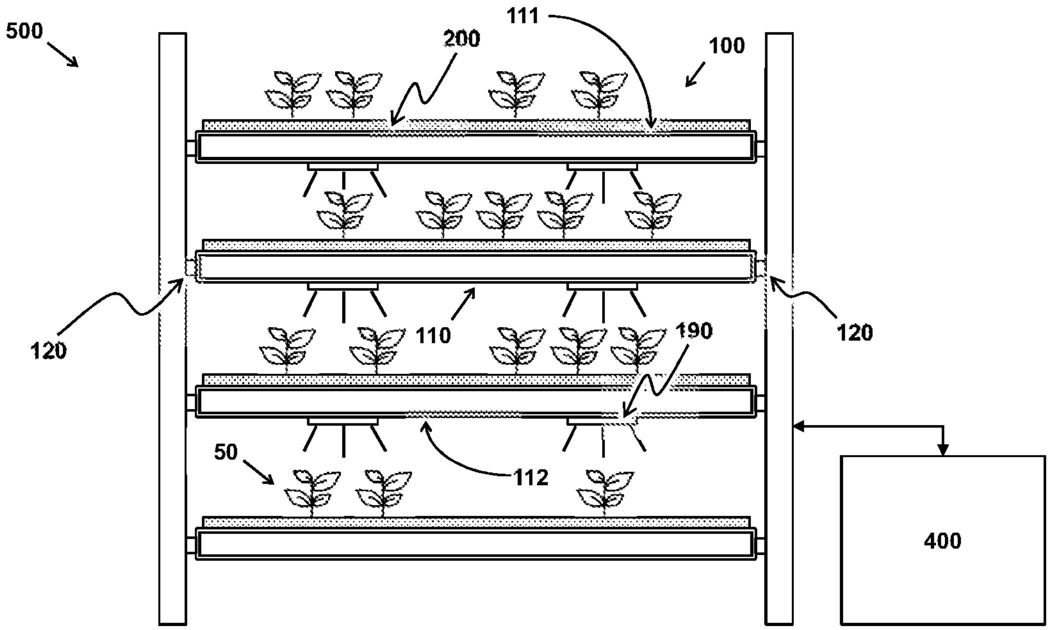
FIG. 6 illustrates a rack, provided with a heat exchanger as described herein.
Figure 7:
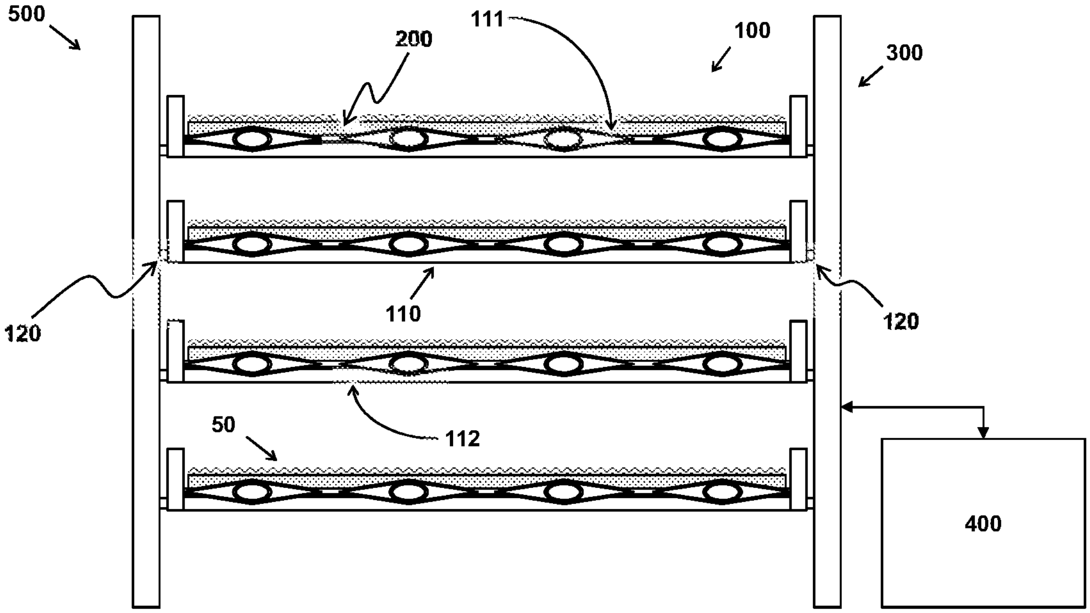
FIG. 7 illustrates a rack, provided with a substrate drawer as described herein.

FIG. 1 illustrates an embodiment of a heat exchanger 100 for temperature control of a substrate 200 for cultivating horticultural products 50, e.g. as part of a horticultural growing arrangement. The substrate 200 can for example be a layer of soil, sawdust or straw, or any other substrate material suitable for growing horticultural products 50, such as mushrooms, fruits, vegetables, herbs or mycelium. For example, the horticultural products 50 illustrated in FIGS. 1, 3 represent mushrooms, the horticultural products 50 illustrated in FIGS. 2 and 6 represent fruits, vegetables or herbs, and the horticultural products 50 illustrated in FIGS. 5 and 7 represent mycelium. The example types of horticultural products 50 illustrated in these figures are not bound or limited to the corresponding embodiments of the heat exchanger shown in the respective figures. Other combinations of embodiment of the heat exchanger 100 and type of horticultural product 50 may be possible.

As shown in FIG. 1, the heat exchanger 100 has a structure 110 that comprises a heat exchange surface 111, e.g. on the side of the heat exchanger facing the substrate 200, arranged for heating or cooling the substrate 200. For example, when growing mycelium, heat may be produced by the mycelium in the substrate 200, and the temperature of the substrate 200 can be controlled by having the heat exchanger 100 cool the substrate 200. In other instances, for example when the mycelium is ready for harvesting, the mycelium can be dried by having the heat exchanger 100 heat the substrate 200.

The structure 110 of the heat exchanger 100 is arranged for supporting the substrate 200, for thereby forming a carrier structure, e.g. a carrier plate with a carrier surface. Accordingly, contrary to conventional arrangements for cultivating horticultural products, there is no need for a separate carrier structure, and the total thermal mass of the arrangement, which may act as a heat sink or heat source, can be reduced. As a result, controllability of the temperature of the substrate 200 can be improved, and the energy efficiency of the heat exchanger 100 can be increased.

As illustrated in FIG. 1, the heat exchange surface 110 forms the carrier surface for carrying the substrate 200. As such, when transferring heat between the heat exchanger 100 and the substrate 200, loss of energy is minimized, e.g. by minimizing the thermal mass between the heat exchanger 100 and the substrate 200. To further minimize thermal masses, the heat exchanger 100 comprises or is configured for cooperating with one or more mounts 120 arranged for suspending the heat exchanger 100 to a support structure, and the structure 110 of the heat exchanger 100 is constructed such as to be self-supporting for supporting the substrate 200 at least between the one or more mounts 120, e.g. in a rack.

For example, each mount 120 may have a contact area through which heat can be transferred, e.g. by conduction, between the heat exchanger 100 and the support structure when the heat exchanger 100 is suspended to the support structure. To limit transfer of heat between the heat exchanger and the support structure, the contact area may be relatively small. Alternatively, the number of mounts 120 may be reduced. For example, the total contact area of the one or more mounts 120 combined may be significantly smaller than the carrier surface area, e.g. less than 10% of the carrier surface area, preferably less than 5% of the carrier surface area.

The one or more mounts 120 can for example be arranged along one or more edges of the heat exchanger 100, e.g. between opposing edges of the heat exchanger 100. The mounts 120 can be arranged for rigidly or movably suspending the heat exchanger 100, e.g. by comprising a clamping arrangement or a bearing arrangement, respectively, or by any combination of rigid and movable suspension arrangements.

When the heat exchanger 100 is suspended as carrier plate between the mounts 120 for supporting the substrate 200, the structure 110 of the heat exchanger 100 is self-supporting. In this way, the bottom surface 112 of the structure 110 opposite the heat exchange surface 111 can face an ambient environment. In other words, the bottom surface 112 can be freely accessible from and/or be in direct contact with the ambient environment, because it is not substantially covered by supporting elements, such as plates or frames, by insulating material, or by grates. As such, e.g. when the heat exchanger 100 is suspended in a rack, the bottom surface 112 can for example be arranged for heating or cooling a substrate located on a level below the heat exchanger 100.

Preferably, the structure 110 forms an impervious barrier, arranged for preventing passage of substrate material, such as sand or dirt, through the structure 110, so that any horticultural products 50 cultivated on a level below the heat exchanger 100 are not contaminated by the substrate material.

During normal operating conditions, a gravitational load is exerted on the heat exchanger 100, e.g. comprising the own weight of the heat exchanger 100, the weight of substrate 200 and the weight of any horticultural products 50 cultivated thereon. The structure 110 may be self-supporting so that, e.g. under the gravitational load, the deformation of the heat exchanger 100, due to bending stress, is within an elastic deformation regime, while the deflection of the carrier surface is within a deflection threshold.

The structure 110 can for example be made of an aluminium alloy material, or any other material that has a relatively high thermal conductivity, Young's module and yield strength, versus a relatively low density, such as steel alloys, magnesium alloys, or brass alloys.

Alternatively, or additionally, the structure 110 can be designed to have a relatively high bending stiffness in a direction normal to the plane of the carrier surface, to minimalize deflection of the carrier surface due to gravitational loads. For example, the second moment of area of the structure 110, around an axis in plane P of the carrier plate, can be increased by maximizing the height of the structure 110 in a direction normal to the plane P of the carrier plate. As such, the out of plane bending resistance of the structure 110 can be increased. By maximizing the height H, the structure 110 can remain thin walled. In this way, the thermal resistance of the heat exchanger 100, for transferring heat between the heat exchanger 100 and the substrate 200, can be minimalized.

A further synergistic effect of maximizing the height H while minimizing the wall thickness of the structure 110 is that the mass of the heat exchanger 100, and thus the gravitational load as well as the thermal mass, can be reduced. Accordingly, the structure 110 of the heat exchanger 100 can provide improved mechanical properties, for supporting the substrate 200, as well as improved thermal properties, for exchanging heat with the substrate 200.

FIG. 2 illustrates a cross sectional view of an embodiment of a heat exchanger 100, wherein the structure 110 comprises one or more support members 118 that provide structural integrity in a lateral direction, parallel to the plane P of the carrier plate. The support members 118, such as beams, bars, brackets, or plates, can be arranged at an offset to the plane P to support the bottom surface 112, e.g. directly or via intermediate bushings. The one or more support members 118 may span between longitudinal edges of the carrier plate, between lateral edges of the carrier plate, and/or between corners of the carrier plate. Since the bottom surface 112 of the structure 110 opposite the heat exchange surface 111 is intended to face an ambient environment, the one or more support members 140 may be relatively slender, to minimally obstruct the bottom surface 111, as shown in FIG. 3. For example, the support member 118 can comprise a folded plate, e.g. with a U profile having legs oriented perpendicular to the plane P of the carrier plate. The support member 118 can be provided with alignment means, such as cutouts or protrusions, for aligning the carrier plate with the support member.

As illustrated in FIG. 2, the structure 110 can further comprise an extendible section 115. The extendible section is configured to extend or shorten in plane P of the carrier plate for compensating thermally induced contraction or expansion of the heat exchanger 100, respectively. For example, when the heat exchanger 100 heats up the substrate 200, the structure 110 may expand in plane P of the carrier plate. Since the expansion of the structure 110 may be laterally constrained, e.g. due to the fixation of the heat exchanger 100 to a rack or other support structure, thermally induced stress may build up inside the structure, which can cause irreversible damage to the heat exchanger 100. In such cases, the extendible section 115 can shorten, e.g. by elastic deformation thereof, to compensate for thermally induced expansion, thereby preventing the building up of stress inside the structure 110. The extendible section 115 can e.g. have a relatively low stiffness in plane P of the carrier plate, compared to the rest of the structure 110. For example, the extendible section 115 can comprise a biasing element, arranged for exerting a preload force in plane P of the carrier plate. The biasing element can e.g. be integrated in the structure 110, when the extendible section 115 has a wall that is corrugated and relatively thin, e.g. forming a bellows. Alternatively, or additionally, at least one of the mounts 120 can comprise a biasing element, or be elastically deformable, in plane P of the carrier plate.

Figure 4:
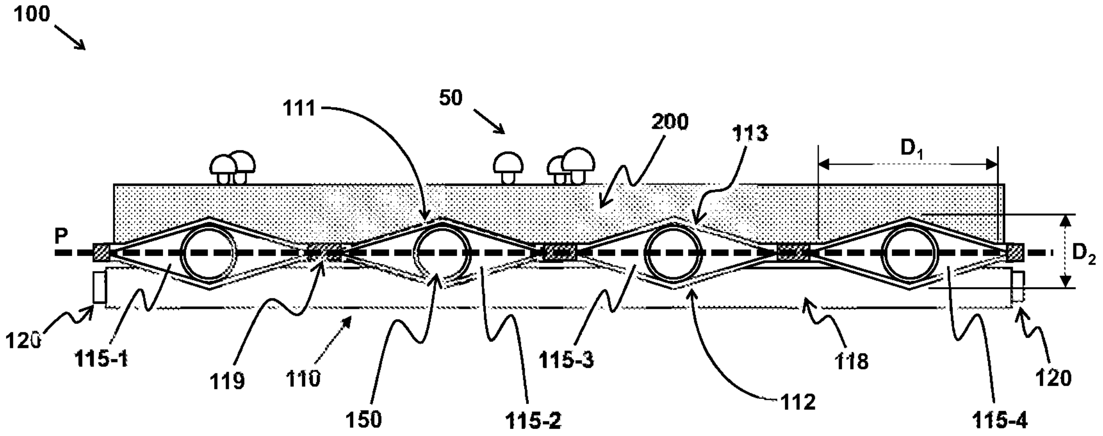
FIG. 4, illustrates a cross sectional view of another or further embodiment of a heat exchanger, comprising compartments.

FIG. 4 provides a cross sectional view of an embodiment of a heat exchanger 100, in which the structure comprises a number of compartments 115-1, . . . , 115-N, e.g. two or more than two compartments 115. Here, the extendible section is formed by the compartments 115. The heat exchange surface 111 and the bottom surface are corrugated, folded or bent, thereby providing an elastically deformable mechanism in plane P of the carrier plate.

Each compartment can comprise a circumferential wall with a top portion, e.g. providing the heat exchange surface 111, and a bottom portion, e.g. providing the bottom surface 112. The top portion and the bottom portion may be interconnected at respective opposing end sections thereof in plane P of the carrier plate. Each of the top and bottom portion can comprise a middle section that is bent outwards with respect to the plane P of the carrier plate. Accordingly, each compartment may comprise an eye-shaped, or diamond shaped cross section, e.g. a cross section that has a long diagonal $D_1$ and a short diagonal $D_2$. The long diagonal $D_1$ can e.g. be in plane P of the carrier plate, while the short diagonal $D_2$ can be perpendicular to the plane P of the carrier plate. As such, thermal expansion of the heat exchanger 100 in plane P of the carrier plate can be compensated by shortening of the long diagonal $D_1$ and expansion of the short diagonal $D_2$. Alternatively, the long and short diagonals $D_1$, $D_2$ may be at an angle with respect to the plane P of the carrier plate, e.g. to reduce the expansion of the short diagonal $D_2$ when the heat exchanger 100 thermally expands in plane P of the carrier plate.

By reducing the thickness of the circumferential outer wall 113, the thermal mass of the heat exchanger 100 can be reduced, thereby optimizing its efficiency. Moreover, in combination with having a corrugated, folded or bent circumferential outer wall 113, the stiffness of the compartment 115 in plane P of the carrier plate can be decreased, thereby increasing the flexibility of the compartment. In this way, the compartment 115 can extend or shorten in plane P of the carrier plate for compensating thermally induced contraction or expansion of the heat exchanger, by elastic deformation of the. Instead of all compartments 115-1, . . . , 115-N having the same circumferential outer wall 113 design, one or more compartments may have a circumferential outer wall 113 with a relatively low stiffness in plane P of the carrier plate, while other compartments may have a circumferential outer wall 113 with a relatively high stiffness in plane P of the carrier plate. This can e.g. be achieved by varying the wall thickness of the circumferential outer wall 113 between compartments 115. Accordingly, a selected one or more compartments 115 are arranged for forming the extendible section, thus with increased flexibility for compensating thermal expansion of the heat exchanger 100, while other compartments are e.g. designed for structural integrity.

The compartments 115 can be interconnected by elastic elements 119, that are elastically deformable in plane P of the carrier plate. Accordingly, the seams between compartments, of which the width can be larger or smaller depending on the temperature of the compartments 115, can be sealed by the elastic elements to provide an impervious carrier plate for preventing passage of substrate material through the structure 110.

The elastic elements can e.g. be made of a bent metal plate or hollow profile, such as a U-profile or an O-profile, to form a thermally conductive, yet elastically deformable connection between compartments 115. Alternatively, the elastic elements 119 can be made of a polymer or rubber material, forming an insulating connection between compartments 115. The heat exchanger 100 can also circumferentially be provided with one or more elastically deformable elements 119, while the compartments are rigidly interconnected, e.g. by a welded or brazed connection.

As illustrated in FIG. 4, each compartment 115-1, . . . , 115-N can be provided with a channel 150, through which a fluid can flow for heating or cooling the heat exchange surface 111. The channels 150 can for example be made of a material with good thermal conductive properties, e.g. a metal such as an aluminium, steel or copper alloy. The channel 150 can e.g. be made of the same material as the structure 110, or at least as the same material as the circumferential outer wall 113. The wall of the channel 150 may be thermally coupled to the circumferential outer wall 113. When a cooling or heating fluid, such as water or oil, is direct through a channel 150, heat is transferred between the fluid and the substrate 200 via the channel wall and the circumferential outer wall 113. Alternatively, each compartment 115 can itself form a channel for directing a fluid for heating or cooling the heat exchange surface 111.

The channels 150 can e.g. be part of an energy recovery system, for recovering energy from heat produced by the substrate 200. For example, when cultivating mycelium, heat is produced in the substrate 200 which can be recovered by transferring the heat to a cooling fluid passing through the channels 150. The energy transferred to the cooling fluid can be stored and reused by the energy recovery system, e.g. for heating up a mycelium substrate during its harvesting phase.

FIG. 5 illustrates a substrate drawer 300, provided with a heat exchanger 100 as described herein. The carrier plate of the heat exchanger 100 is suspended to drawer walls 180. Accordingly, a drawer is formed for containing the substrate 200 and horticultural products 50 cultivated thereon, such as mycelium. The drawer walls 180 are movably mountable to a rack, e.g. by having a bearing arrangement 120 provided on the drawer walls 180. The bearing arrangement may for instance include a planar bearing profile or roller bearings, that engage with respective roller bearings or bearing profiles on the rack. Alternatively, a bearing arrangement can be provided directly on the heat exchanger 100, e.g. on the structure 110 or on the support member 118, for movably mounting the heat exchanger 100 to the rack. The one or more mounts 120, for movably mounting the heat exchanger to the rack, may comprise at least one of: bearings, rails or a carriage or sled.

FIGS. 6 and 7 illustrate four-level racks 500, wherein each level is provided with a heat exchanger 100 as described herein. In FIG. 6 the heat exchangers 100 are directly suspended to the rack 500, by opposing mounts 120. In FIG. 7, each heat exchanger 100 is provided in a substrate drawer 300, which in turn is suspended in the rack 500 by opposing bearing arrangements 120.

As described herein, the structure 110 of the heat exchanger 100 is self-supporting for supporting the substrate 200 between the opposing mounts or bearing arrangements 120, such that a bottom surface 112 of the structure 110 opposite the heat exchange surface 111 faces an ambient environment, e.g. an environment between adjacent levels of the rack 500.

The bottom side of the heat exchanger 100, e.g. the bottom surface 112, can be provided with a light source 190, such as a LED or UV light source, as illustrated in FIG. 6. The light source 190 can e.g. be integrated in the bottom surface 112. Accordingly, the lighting conditions of a lower level substrate and horticultural products 50 cultivated thereon can be controlled. Beneficially, by having the light source 190 directly mounted to or integrated in the bottom side of the heat exchanger 100, waste heat produced by the light source 190 can be dissipated or recovered by the heat exchanger 100. For example, waste heat produced by the light source 190 can be used for heating up the substrate 200, so that less transfer of heat is needed from a heating fluid of the heat exchanger. As such, the efficiency of the heat exchanger 100 can be improved. In contrast, in conventional racks the lighting source is mounted to a bottom plate, which is thermally insulated from the heat exchanger and/or the substrate, and therefore may not contribute to the efficiency of the heat exchanger.

As shown in FIGS. 6 and 7, the rack may additionally comprise an energy recovery system 400 that is connectable to the heat exchangers 100, for recovering energy from fluid, such as water or oil, obtained from the heat exchangers 100. In this way, the efficiency of the heat exchangers can further be improved.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described.

The invention applies not only to horticultural applications where the heat exchanger is used for temperature control of a substrate, but also to other technical, agricultural or industrial applications where a heat exchanger is used. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim.

The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope.

Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extent that structure, material, or acts are considered to be essential they are inexpressively indicated as such. Additions, deletions, and modifications within the purview of the skilled person may generally be made without departing from the scope of the invention, as determined by the claims.

The invention claimed is:

1. A rack for carrying a substrate for cultivating horticultural products, wherein the rack is provided with a heat exchanger for temperature control of the substrate, the heat exchanger having a structure comprising a heat exchange surface arranged for heating or cooling the substrate, wherein the structure forms a carrier plate with a carrier surface for supporting the substrate, wherein the heat exchange surface forms the carrier surface, wherein one or more mounts suspend the heat exchanger at or along its edges to the rack, and wherein the structure of the heat exchanger is self-supporting for supporting the substrate at least between the one or more mounts without additional support elements below the heat exchanger, such that a bottom surface of the structure opposite the heat exchange surface faces an ambient environment, wherein the structure comprises an extendible section, configured to extend or shorten laterally in a plane of the carrier plate between the mounts for compensating thermally induced contraction or expansion of the heat exchanger, respectively, wherein the structure forms an impervious barrier, arranged for preventing passage of substrate material through the structure.

2. The rack according to claim 1, wherein the structure of the heat exchanger comprises one or more support members, wherein the one or more support members provide structural integrity in a direction parallel to the plane of the carrier plate.

3. The rack according to claim 1, wherein the extendible section is configured to extend or shorten by elastic deformation thereof.

4. The rack according to claim 3, wherein the structure comprises at least two compartments, wherein the extendible section is formed by at least one compartment of the at least two compartments.

5. The rack according to claim 4, wherein each compartment of the at least two compartments comprises a circumferential outer wall, providing the heat exchange surface.

6. The rack according to claim 5, wherein the circumferential outer wall comprises a top portion and a bottom portion, wherein the top portion and the bottom portion are interconnected at respective opposing end sections thereof in the plane of the carrier plate, and wherein each of the top and bottom portions comprises a middle section that is bent outwards with respect to the plane of the carrier plate.

7. The rack according to claim 6, wherein the circumferential outer wall has a diamond shaped cross section, having a long diagonal and a short diagonal, wherein the long diagonal is in the plane of the carrier plate and wherein the short diagonal is perpendicular to the plane of the carrier plate.

8. The rack according to claim 7, wherein the at least two compartments are interconnected by elastic elements that are elastically deformable in the plane of the carrier plate.

9. The rack according to claim 7, wherein the heat exchanger is circumferentially provided with one or more elastically deformable elements; wherein the at least two compartments are rigidly interconnected.

10. The rack according to claim 4, wherein each compartment of the at least two compartments comprises a channel, through which a fluid can flow for heating or cooling the heat exchange surface.

11. The rack according to claim 10, wherein the channel is connectable to an energy recovery system, the energy recovery system being arranged for recovering energy from heat produced by the substrate.

12. The rack according to claim 1, wherein the structure comprises one or more walls mounted to the carrier plate.

13. The rack according to claim 1, wherein the one or more mounts, for movably mounting the heat exchanger to the rack, comprise at least one of: bearings, rails or a carriage or sled.

14. The rack according to claim 1, wherein a bottom side of the heat exchanger is provided with a light source.

* * * * *